J. F. APPLEBY.
GRAIN BINDER.
No. 257,837.
Patented May 16, 1882.
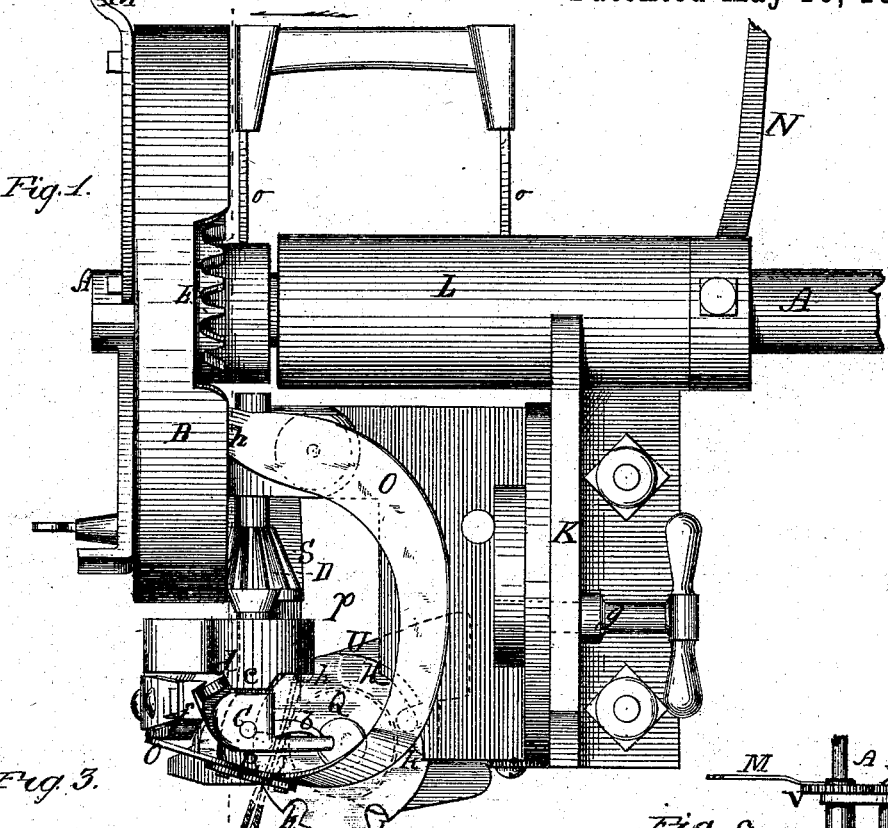
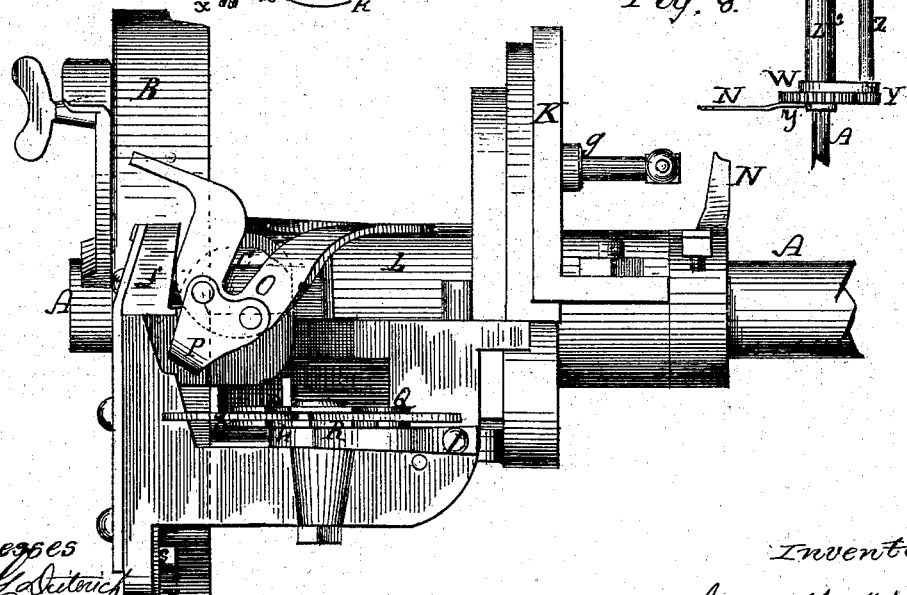
Witnesses
Fred G. Dieterich
J. S. Brown
Inventor
John F. Appleby J. F. APPLEBY.
GRAIN BINDER.
No. 257,837.  Patented May 16, 1882.
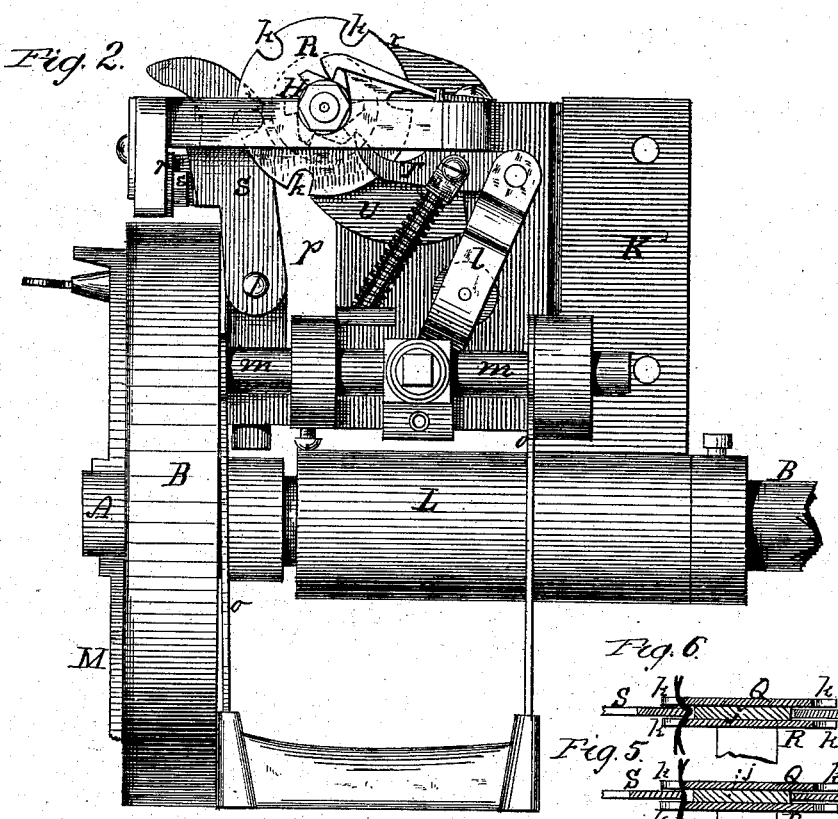
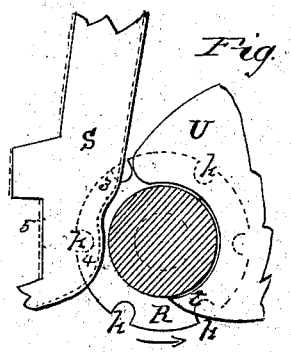
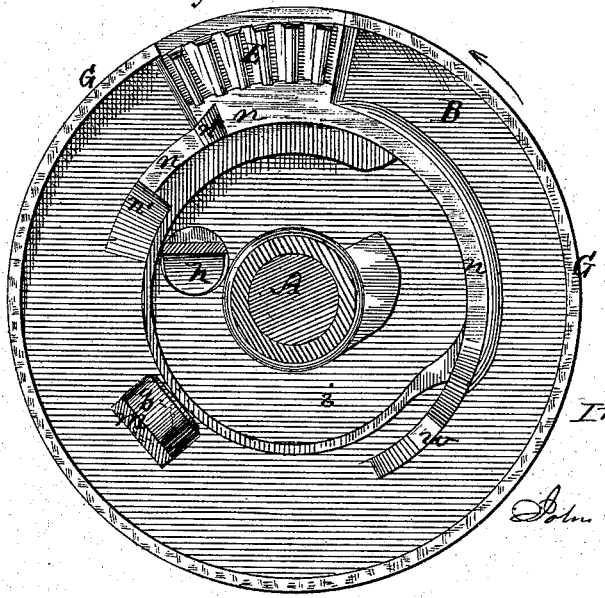

UNITED STATES PATENT OFFICE.

JOHN F. APPLEBY, OF BELOIT, WISCONSIN.

GRAIN-BINDER.

SPECIFICATION forming part of Letters Patent No. 257,837, dated May 16, 1882.

Application filed November 2, 1877.

*To all whom it may concern:*

Be it known that I, JOHN F. APPLEBY, of Beloit, in the county of Rock and State of Wisconsin, have invented certain new and useful Improvements in Self-Binding Harvesters; and I do hereby declare the following to be a full, clear, and exact description thereof, reference being had to the accompanying drawings, forming part of this specification.
In said drawings, Figure 1 is a top view of an automatic binding mechanism embracing my improvement. Fig. 2 is a bottom view of the same. Fig. 3 is a front view of the same. Fig. 4 is a partial vertical section at the line $x$ $x$ of Fig. 1, looking in the direction indicated by the arrow in the last-named figure. Figs. 5, 6, and 7 are detail views of parts for special reference hereinafter. Fig. 8 is a partial plan view on a reduced scale, showing a modification of one of the features of my invention.

The precise form of organization in which I have herein shown the several features of my present invention embraces a construction and arrangement especially adapted to that form of grain-binding harvesters made the subject of Letters Patent granted to me February 18, 1879, and numbered 212,420. My improvements are, however, applicable to other self-binder organizations in which the cord-needle has a similar movement, and in which the movements of the other parts are similarly timed with reference to the motion of the tying devices.

Several of the parts shown are nearly or quite similar in structure and operation to the corresponding parts of the contrivance shown and described in my said Letters Patent. For instance, the driving-shaft A, with its cam-and-rack wheel B, and also the hook-tyer C, which is driven by a pinion, D, on its shaft, with which pinion engages intermittingly the rack E on the face of said wheel, are substantially like the analogous parts of the machine in my said patent; and, in like manner, the said rack E has one less tooth than the pinion D, for the purpose of insuring a complete revolution only of said pinion (and hence one turn of the tyer-shaft) during each time of engagement of said rack with said pinion.
In like manner, also, to said patented machine, the cam-and-rack wheel has a cam-flange, G, which extends around the edge of said wheel's face, with the exception of that part thereof which lies adjacent to the rack E, which flange G acts against a plain face or delay-surface on the pinion D, for the purpose of preventing any movement of the tyer, except while it shall be performing the necessary knot-tying operation.

The finger $b$ of the tyer C is opened by a stationary cam, $c$, which acts on the anti-friction wheel $d$ at the heel of said finger, and is closed by the action upon said wheel of a spring-pressure cam, $f$, all in a manner nearly similar to the analogous parts of my said patented machine. In like manner the entire present apparatus is adapted to be attached by a single thumb-screw, $g$, to a flange, K, on the sleeve L, which surrounds the driving-shaft A; but in my present improved contrivance the sleeve L, instead of being rigidly attached to a part of the frame of the binding mechanism and operating to support the outer end of the driving-shaft, is itself in part supported by the said shaft, which is journaled at its two ends in suitable bearings on the binder-frame. The said sleeve may therefore be made comparatively short, not necessarily extending inward beyond the tying apparatus itself. By this novel construction I am enabled to apply to the shaft A an auxiliary rotatory sheaf-discharging arm, N, which projects from said shaft A in the same plane with and to the same extent as the arm M. (Seen in both my present and former machines.)

The function and effect of this auxiliary revolving arm N, the addition of which constitutes a novel feature in my present contrivance, are a co-operative action of the two revolving arms M and N upon the bound sheaf, a more complete separation of the same from the grain from which the next sheaf is to be formed, and a more certain discharge of the bound sheaf clear of the machine than is possible in an organism in which the sheaf to be discharged is acted upon at one side only of its bound or banded middle portion by a revolving discharging arm or sweep.

The cord-guide O has a lateral movement and is operated by a hook, $h$, acted on by a cam-groove, $i$, in the inner face of the cam-and-rack wheel, all in substantially the manner shown and described in my said patent; but in the present contrivance the cord-severing knife P is attached to the cord-guide O, and the peculiar operation of this novel arrangement I will hereinafter explain.

An important feature of my present machine is a novel cord-holder, which consists essentially of two circular disks, Q and R, having their edges notched as shown, and an intermediately-arranged holder-plate, S, of peculiar form, and co-operating with said disks in a manner which I will presently explain. The two notched disks Q and R are mounted on the same axis, and are separated a given distance by an interposed washer, $j$. (See Figs. 5 and 6, which are sectional views of the parts therein shown.) These disks are arranged with the notches of one immediately in line over those of the other, and they have an intermittent rotating movement, which is effected by means of a pawl, T, pivoted at one end to a vibratory lever, $l$, and engaging at its other end with the teeth of a ratchet-wheel, H, on the same axis with said disks. The other end of the vibratory lever $l$ is coupled to a longitudinally-sliding bar, $m$, and this bar is moved back and forth periodically by means of a cam, $n$, on the face of the cam-and-rack wheel that moves said bar in one direction, and counteracting-springs $o\ o$, which move it in the other direction.

The plate S is pivoted at one end to the frame of the tying mechanism. It is of the peculiar form shown, and is pressed up to its operative position by a spring, $r$, but is so arranged that when forced back (in opposition to the pressure of said spring) to a certain extent by the pulling action of the cord it will come to a stop against or will abut (at its rear edge) on a fixed part of the frame or casting, and will then resist any further pressure on it by the pull of the cord in a perfectly rigid and positive manner.

The operation of this cord-holder may be thus explained: As the cord-needle descends through the aperture $p$ of the tying mechanism it draws the cord into the adjacent pair of notches of the disks Q and R, the plate S acting to guide the cord from one side into said notches, and a guide-plate, U, acting to similarly guide the cord from the other side. (See Fig. 7.) After the cord has thus been laid in the said pair of notches, the disks Q and R are rotated a distance equal to the pitch of their notches—that is, the distance from one notch to the next, and the cord is thereby drawn in and cramped and frictionally held between the inner or adjacent faces of the two disks and the sides and edge of the intermediately-located plate S. During the movement of the disks Q and R, and while the cord is thus frictionally held between said disks and the plate S, (see Figs. 5 and 6,) the knot-tyer operates to form the knot, and the two folds or strands of the tied cord are severed by the knife $p$. The rotating movement of the disk is in successive steps, caused by the action of the cams $n'$ and $n''$ successively on the sliding bar $m$, which works the pawl T, and the cord-cramping edge of plate S is of a peculiar shape, the part 4 projecting farther toward the axis of the disks than does the part 3, all of which peculiarities, together with the arrangement of the plate S by which it is caused to come to a positive stop on the frame at its rear edge, result in the following action, viz: During the first (and greater) part of the movement of the disks the cord is slightly cramped between them and the portion 3 of plate S, as seen in Fig. 5, and is there held so loosely that it may be pulled through the grip of these devices by the knot-tyer, which, during the same time, is forming the knot-loop, and needs to take up sufficient cord for that purpose. During the final part of the movement of the disks, (and from then till the beginning of their next movement,) while the ends of the cord are being pulled through the knot-loop by the tyer, and when it is necessary that the cord-holder should securely grip the cord, the cord is cramped more securely between the disks and the intervening plate, S, for two reasons—first, because at this time the notches have come adjacent to the part 4 of plate S, that projects farther in toward the axis of the disks, and hence makes a longer double of the cord; and, second, because the plate S, having yielded until it has come to a stop by its portion 5 abutting against a fixed part of the frame of the machine, now acts as a rigid clamp instead of as a yielding clamp, as it does when it is held up to its co-operative action with the disks Q and R merely by the spring $r$.

To regulate the action of the spring $r$ its tension may be varied by means of a set-screw, $s$. At the time when the tyer is making its upward movement and the finger is closed to hold the ends of the cord and the cord-guide O performs its lateral movement, all in about the manner described in my Letters Patent hereinbefore referred to, the notches of the disks Q and R first approach and then get nearly in line with and directly beneath the tyer, as indicated in Fig. 1, so that the cord-guide in making the said movement draws on the cord in a nearly direct line, and at the same time causes the knife P to act thereon with a drawing cut and sever the cord. Thus the cutting operation is performed effectually by an arrangement simple and positive in its structure and action. The knife of course severs two parts of the cord—the part which connects the tied band with the main cord and the end part which is still held with the main cord in the notched cord-holder disks. The knife P is placed so near to the tyer that it cuts the cord quite close to the knot, and hence the ends may be readily pulled through the loop to form a "hard knot." The discharge of the bound sheaves from the machine finally and certainly pulls the knot and cord ends away from the tyer, when this may not have been already done by the action of the cord-guide.

Inasmuch as it is designed to have the tying mechanism remain at rest while the gavel is being formed, (the cam-and-rack wheel being thrown out of gear with the driving mechanism for that purpose,) it is desirable that the tying mechanism and the said cam-and-rack wheel shall come to a stop in the proper positions, and not be moved past the proper stopping-place by the inertia of the heavy and rapidly rotating parts.

To insure the stoppage of the parts at the right place I utilize the sliding bar $m$, with its counteracting-springs $o$ $o$, for the purpose of a brake on the revolving cam-and-rack wheel.

I provide said wheel with a cam-surface at $w$, arranged in such a position that as soon as the heel of the bar $m$ or its roller $q$ shall have passed off of the cam-surface $n$ it shall come into contact with said cam $w$. In order to ascend this cam, the springs $o$ $o$ must again be compressed, and as this effect can be accomplished only by a continuance of the rotation of said wheel past the point designed for it to stop at, it follows that any tendency of the wheel to continue its movement past this point by its inertia will be counteracted by the springs $o$ $o$.

Although I have shown in the principal views of the drawings and have so far described a short sleeve, L, on the shaft A to permit the employment of the arm N for the purpose explained, a modified construction of this part of the machine—such as seen in Fig. 8—may be employed in carrying out this part of my invention. In said modification a long sleeve, $L^2$, is employed, which is fastened at one end to the binder-frame, and the arm N is mounted to turn on the sleeve. In this form of my invention the revolving motion of the arm N is imparted to it from the shaft A through the medium of gears V, X, Y, and W, the first of which is fast on shaft A, while X and Y are keyed on a counter-shaft, Z, and W is fast on or formed as part of the hub of the arm N.

Having now so fully described my invention that any one skilled in the art can make and use a self-binder embracing either a portion or all of the features thereof, what I claim as new, and desire to secure by Letters Patent, is—

1. In combination with the driving-shaft A and its sheaf-discharging arm M, located at the outer side of the tying mechanism, an auxiliary revolving arm, N, located at the inner side of said mechanism, and rotating about the shaft A simultaneously with arm M, substantially as and for the purpose set forth.

2. The cord-guide O, having the cord-severing knife P mounted thereon and operating therewith, in substantially the manner and for the purpose herein specified.

3. The combination of the intermittingly-revolving disks Q and R, the holder-plate S, having its operative edge arranged between said disks and shaped as described, and means, substantially as described, by which said holder is adapted to act first with a yielding and then with a rigid pressure, all substantially in the manner and for the purpose described.

4. The combination, with the disks Q R, provided with a ratchet-wheel, of the pawl T, the bolt $m$, which actuates said pawl, and the cam $n$, formed with two steps, $n$ $n'$, for actuating said bolt and imparting to said disks two successive movements at each stroke of the pawl, substantially as hereinbefore described.

5. The combination, as shown, of the cord-guide O, severing-knife P, and their actuating mechanism, with the tyer C and cord-holding devices Q, R, and S, for the triple purpose of guiding the cord to the tyer, drawing the knot therefrom, and severing the cord, all substantially as set forth.

6. In combination with the tying mechanism, the actuating cam-and-rack wheel provided with the cam $w$, the sliding bar $m$, and the springs $o$ $o$ acting thereon, the construction and operation being such, as described, that the bar $m$, with its springs $o$ $o$, operates as a brake on said wheel to insure the stoppage of the parts in the proper place, substantially as set forth.

JOHN F. APPLEBY.

Witnesses:
A. A. HOTNELL,
J. S. BROWN.